(12) United States Patent
Tal et al.

(10) Patent No.: US 6,625,612 B1
(45) Date of Patent: Sep. 23, 2003

(54) DETERMINISTIC SEARCH ALGORITHM

(75) Inventors: Alex Tal, Hadera (IL); Shifra Rachamim, Kefar Tayor (IL)

(73) Assignee: Ezchip Technologies Ltd., Migdal Haemek (IL)

( * ) Notice: Subject to any disclaimer, the term of this patent is extended or adjusted under 35 U.S.C. 154(b) by 443 days.

(21) Appl. No.: 09/593,397

(22) Filed: Jun. 14, 2000

(51) Int. Cl.[7] .............................................. G06F 17/30
(52) U.S. Cl. ...................................................... 707/102
(58) Field of Search ........................................ 707/102

(56) References Cited

U.S. PATENT DOCUMENTS

| | | | |
|---|---|---|---|
| 5,121,495 A | 6/1992 | Nemes | |
| 5,237,681 A | 8/1993 | Kagan et al. | |
| 5,367,672 A | 11/1994 | Takagi | |
| 5,390,359 A * | 2/1995 | Damerau | 707/3 |
| 5,448,641 A * | 9/1995 | Pintsov et al. | 380/51 |
| 5,673,316 A * | 9/1997 | Auerbach et al. | 705/51 |
| 5,805,911 A * | 9/1998 | Miller | 715/534 |
| 5,864,842 A | 1/1999 | Pederson et al. | |
| 5,873,074 A | 2/1999 | Kashap et al. | |
| 5,946,679 A | 8/1999 | Ahuja et al. | |
| 5,960,434 A * | 9/1999 | Schimmel | 707/100 |
| 6,009,432 A | 12/1999 | Tarin | |
| 6,091,835 A * | 7/2000 | Smithies et al. | 382/115 |
| 6,105,134 A * | 8/2000 | Pinder et al. | 713/170 |
| 6,263,431 B1 * | 7/2001 | Lovelace et al. | 713/2 |
| 6,341,273 B1 * | 1/2002 | Briscoe | 705/41 |
| 6,367,012 B1 * | 4/2002 | Atkinson et al. | 713/176 |
| 6,430,184 B1 * | 8/2002 | Robins et al. | 370/392 |

* cited by examiner

*Primary Examiner*—Wayne Amsbury
(74) *Attorney, Agent, or Firm*—Mark M. Friedman

(57) ABSTRACT

A method for storing and retrieving a key using a hash table, the method comprising the steps of: (a) hashing the key using a first hash function, thereby transforming the key into a table address in the hash table; (b) hashing the key using a second hash function, distinct from the first hash function, thereby transforming the key into a key signature; and (c) entering the key signature in a signature page located at the table address.

11 Claims, 7 Drawing Sheets

FIGURE 1

| TABLE 1 | | | TABLE 2 | | | TABLE i | | |
|---|---|---|---|---|---|---|---|---|
| entry | valid | last | entry | valid | last | entry | valid | last |

PRIOR ART

PRIOR ART

DETERMINISTIC SEARCH ALGORITHM

FIELD AND BACKGROUND OF THE INVENTION

The present invention relates to computer-based information storage and retrieval systems, to the use of hashing techniques in such systems, and more particularly, to the use of hashing techniques in networking applications.

Information or data stored in a computer-controlled storage mechanism can be retrieved by searching for a particular key in the stored records. The stored record with a key matching the search key is then retrieved. Such searching techniques require repeated accesses or probes into the storage mechanism to perform key comparisons. In large storage and retrieval systems, such searching, even if augmented by efficient search algorithms such as a binary search, often requires an excessive amount of time.

Another well-known and much faster method for storing and retrieving information from computer store involves the use of so-called "hashing" techniques. These techniques are also sometimes called scatter-storage or key-transformation techniques. In a system using hashing, the key is operated upon by an operator to produce a storage address in the storage space. The operator is called a hashing function, and the storage space is called a hash table. The storage address is then used to access the desired storage location directly with fewer storage accesses or probes than sequential or binary searches. Hashing techniques are described in the classic text by D. Knuth entitled The Art of Computer Programming, Volume 3, Sorting and Searching, pp. 506–549, Addison-Wesley, Reading, Mass., 1973, and more recently, in the contemporary classic text of R. Sedgewick entitled "Algorithms in C++", pp. 231–243, Addison-Wesley, Reading, Mass., 1992.

Hashing functions are designed to translate the universe of keys into addresses uniformly distributed throughout the hash table. Typical hashing operations include truncation, folding, transposition and modulo arithmetic. A disadvantage of hashing techniques is that more than one key can translate into the same storage address, causing "collisions" in storage or retrieval operations. Some form of collision-resolution strategy must therefore be provided. For example, the simple strategy of searching forward from the initial storage address to the first empty storage location will resolve the collision. This technique is called linear probing. If the hash table is considered to be circular so that addresses beyond the end of the table map back to the beginning of the table, then the linear probing is done with "open addressing," i.e., with the entire hash table as overflow spare in the event that a collision occurs.

An alternative to linear probing is a technique commonly referred to as "double hashing" or "multiple hashing". When more than one key translates into the same storage address using the first hash function, the collision can be resolved by selecting a different hash function and "rehashing" those keys (that had returned identical results using the first hash function) in order to differentiate between them. Of course, there is a finite probability that more than one key will translate into the same storage address using the second hash function, in which case the new collision can be resolved by selecting a (different) third hash function and "rehashing" those keys once again in order to differentiate between them. This process can be repeated until all collisions have been resolved. According to Sedgewick, double hashing uses fewer probes, on the average, than linear probing.

Sedgewick cites several examples of improved hashing methods, but cautions against 'premature use of advanced methods except by experts with serious searching applications, because separate chaining and double hashing are simple, efficient, and quite acceptable for most applications.'

One area in which multiple hashing is less effective or even problematic is network applications. Although the average speed is an important parameter in such applications, a more important and often overriding requirement is a highly predictable, deterministic operation. For example, voice and video recordings can be transmitted as data via the Internet using a digital data channel. The Internet network utilizes routers to direct the data from the sending address to the destination address. Routers using multiple hashing routines to locate the destination address and deliver these data packets will have a characteristically high variance in the time required to locate the address. In most cases, typically about 70%–80% of the time, the multiple hashing technique will locate the destination address in the first memory access. However, in about 20%–30% of the time, a second memory access is required. Often, a third, fourth or fifth memory access is required in order to locate the address. Moreover, in the case of voice transmission, a high variance of this kind results in a broken up, non-uniform sound message. These disturbances are often referred to as "jitters".

There is therefore a recognized need for, and it would be highly advantageous to have, a high-performance method for directly referencing records in a table that is more deterministic and has appreciably less variance than existing multiple hashing techniques, a method that both provides fast access to the memory and is efficient with regard to memory space.

SUMMARY OF THE INVENTION

The present invention is a search method for storing and retrieving information records that is fast, efficient with regard to memory usage, and deterministic.

According to one aspect of the present invention there is provided a method for storing a key using a hash table, the method comprising the steps of: (a) hashing the key using a first hash function, thereby transforming the key into a table address in the hash table; (b) hashing the key using a second hash function, distinct from the first hash function, thereby transforming the key into a key signature; and (c) entering the key signature in a signature page located at the table address.

According to further features in preferred embodiments of the invention described below, the method for storing and retrieving information records further comprises the step of: (d) entering a pointer in the signature page, the pointer corresponding to the key signature and pointing to the key.

According to another aspect of the present invention there is provided a method for retrieving a tabulated key using a search key, comprising the steps of: (a) providing a plurality of signature pages, each of the plurality of signature pages having a table address and space for at least one key signature, each of at least one key signature having (i) a corresponding tabulated key, and (ii) an associated key pointer pointing to the corresponding tabulated key; (b) hashing the search key using a first hash function, thereby transforming the search key into a table address; (c) hashing the search key using a second hash function, distinct from the first hash function, thereby transforming the search key into a search key signature, and (d) searching the plurality of signature pages for a signature page having the table address of step (b) for at least one match between the search key signature and at least one key signature.

According to further features in preferred embodiments of the invention described below, the method for storing and retrieving information records further comprises the step of: (e) if the search for the at least one match succeeds: searching for a match between the search key and the corresponding tabulated key.

According to another aspect of the present invention there is provided a system for storing and retrieving data using a search key, the system comprising: (a) a data storage module having a plurality of tabulated signature pages, each of tile tabulated signature pages having a table address and at least one key signature having an associated pointer, the pointer pointing to a corresponding key in the data storage module, and (b) a processor that is operative to perform operations including: (i) hashing the search key using a first hash function, thereby transforming the search key into one of the table addresses; (ii) hashing the search key using a second hash function, distinct from the first hash function, thereby transforming the search key into a search key signature; and (iii) searching the tabulated signature page having the one of the table addresses for a matching key signature to the search key signature.

According to further features in preferred embodiments of the invention described below, the processor is further operative for: (iv) if the search for the matching key signature succeeds: searching for a match between the search key and the corresponding key of the matching key signature.

According to still further features in preferred embodiments of the invention described below, the processor includes an Address and Policy Resolution Logic (APRL) unit.

According to still further features in preferred embodiments of the invention described below, the system further comprises an input/output unit for transferring, to and from the processor, information selected from the group consisting of tabulated keys, search keys and instructions.

According to still further features in preferred embodiments of the invention described below, the input/output unit includes a switching fabric controller.

According to still further features in preferred embodiments of the invention described below, the input/output unit includes a link controller.

According to still further features in preferred embodiments of the invention described below, the link controller is a MAC controller.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 depicts a series of lookup tables for use in a typical multiple hashing search sequence of the prior art;

DESCRIPTION OF THE PREFERRED EMBODIMENTS

Figure 2:
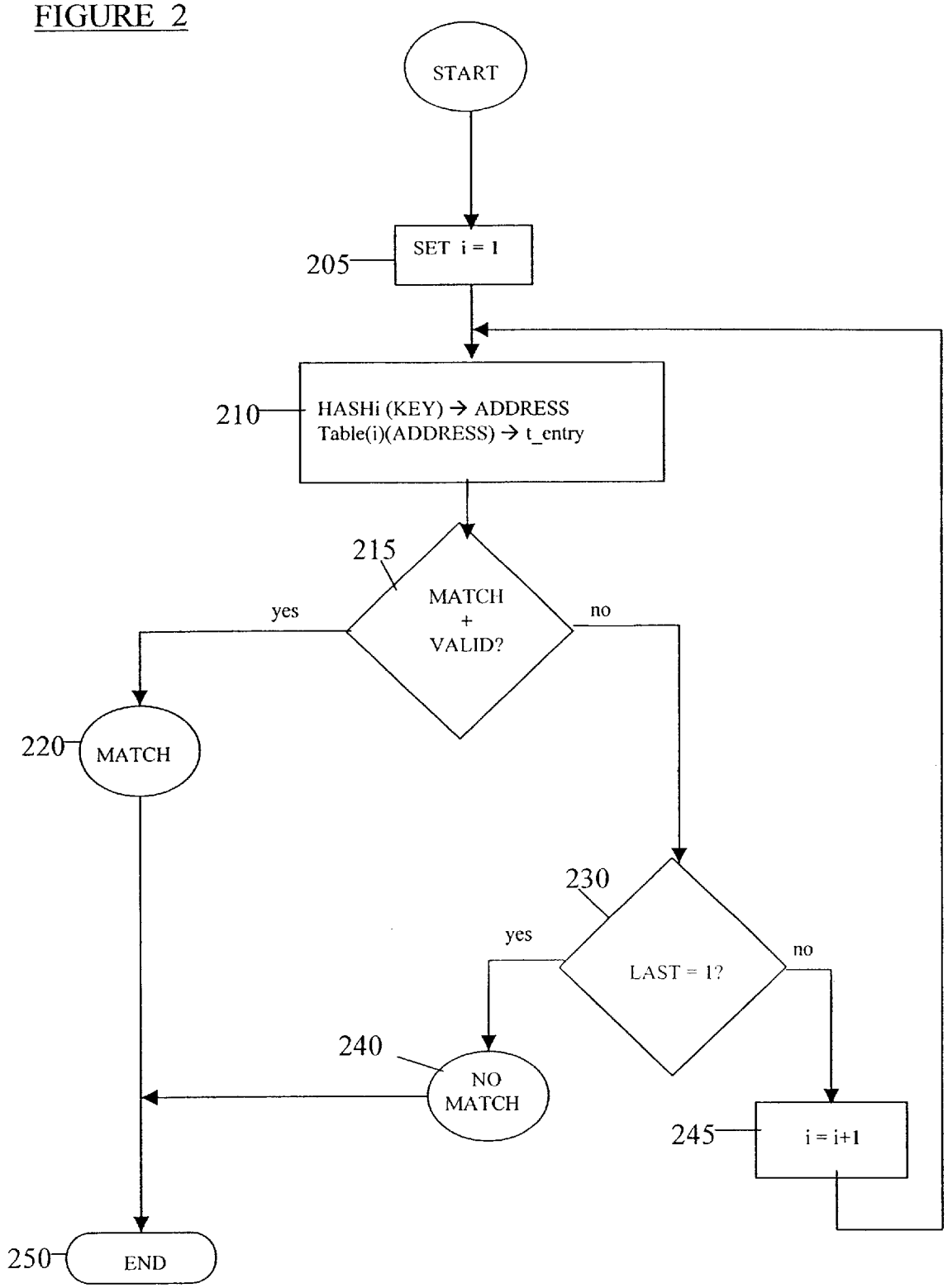
FIG. 2 shows a general flow chart of a typical multiple hashing table searching operation of the prior art.

The present invention relates to computer-based information storage and retrieval systems, and to the use of novel hashing techniques in such systems.

Computer data bases can be classified into three main categories: Hierarchical, Network, and Relational. "The Dictionary of Computers, Information Processing, and Telecommunications" (second edition, 1987, published by John Wiley and Sons) defines a relational data base as "A data base in which relationships between data items are explicitly specified as equally accessible attributes". Accordingly, a relational data base may simply be thought of as a collection of relations where each relation is a table.

Relational data bases accommodate systems that store large amounts of data, providing rapid access for data retrieval, convenient updating, and economic storage. They can represent real world information structures, be reliable, afford privacy, and maintain integrity.

Having defined a relation as the data structure that corresponds to a table, further definitions may now be made of terms used herein to describe the invention.

The entries in a row (the columns) are defined herein as "attributes".

As used herein in the specification and in the claims section that follows, the terms "key", "address key", and tabulated key are used interchangeably. The tern "search key" refers to the key that the search routine is trying to match up with an existing key or address key.

As used herein in the specification and in the claims section that follows, the term "signature" or "key signature" refers to the result of a transformation of a key into a number (or integer) using a hash function or the like, wherein the result of the transformation is entered into a signature page.

As used herein in the specification and in the claims section that follows, the term "signature page" refers to a memory block in which key signatures are entered, the memory block being a part of a table (e.g., "signature page table") and associated with a single table address. As in conventional hashing routines, the table address is the result of a transformation of a key using a hash function or the like. In conventional hashing routines, a key is associated with a table address. The memory block is either filled with a single key, or is vacant. In a signature page according to the present invention, however, the memory block is filled with key signatures (and not the key itself), moreover, several (multiple) key signatures are often entered in one signature page. Relations that occupy more space than available on one signature page may have additional pages assigned as required.

Referring now to the drawings, FIG. 1 depicts a series of lookup tables for use in a typical multiple hashing search sequence of the prior art. Table 1 contains key entries resulting from hash function 1, Table 2 contains key entries resulting from hash function 2, and Table i contains key entries resulting from hash function i. The tables are accessed in series.

Each table contains three columns having attributes. Referring to Table 1 by way of example, Column 1 contains key entries. Column 2 defines the validity of the corresponding key entry from Column 1, with "1" (one) equaling "valid" and "0" (zero) equaling "not valid". Column 3 contains the "last" attribute, which indicates whether the hash function used in preparing Table 1 has returned more than one key to the same table address. This event, known as a collision, occurs relatively frequently in hashing routines. In multiple hashing, the solution is to rehash the key using a dissimilar hash function. The key is then placed in a row of a succeeding table, the row number being determined by the result of the new hash function.

FIG. 2 shows a general flow chart of a typical multiple hashing table searching operation of the prior art. Step 205 initializes the variable i to equal 1, such that the first table searched, Table(i), is Table 1, and the hash function used to transform the key, HASHi(key), is the first hash function HASH1.

In step 210, the key is hashed by the first hash function. The numerical result represents the number of the row in Table 1 that needs to be examined. The key entry from that row, which is situated in the first column of Table 1, may match the search key. In step 215, the search key is compared with the above-mentioned key entry. If they match, and if the key entry is valid, then the search has resulted in a successful match 220 and the operation is ended 250.

If in step 215, the search key and key entry are not identical, or if the key entry is not valid, then the "last" attribute in Column 3 of Table 1 is examined (step 230). If there has been at least one collision in the current row (i.e., if the hash function returned 2 or more keys to the same table address), then the desired key entry may be located in a subsequent table. This is designated by the last attribute equaling zero. In this case (step 245), the value of variable i is increased by 1, and the search routine loops back to step 210, where the key is now "rehashed" using a second hash function. The numerical result returned by the second hash function represents the number of the row in Table 2 that needs to be examined. The key entry from that row, which is situated in the first column of Table 2, may match the search key. In step 215, the search key is compared with the above-mentioned key entry. If they match, and if the key entry is valid, then the search has resulted in a successful match 220 and the operation is ended 250.

If in step 215, the search key and key entry are not identical, or if the key entry is not valid, then the "last" attribute in Column 3 of Table 2 is examined (step 230) once again. If the last attribute (again) equals zero, the value of variable i is increased by 1 (step 245), and the search routine loops back to step 210 as above. If the last attribute equals one, there are no more resolved collisions (and hence no potential matches) for this particular key in any succeeding tables. In step 240, the routine concludes that there is no match, and the search ends 250 with an unsuccessful result.

Multiple hashing methods are usually most efficient when sparsely filled. Typically, the tables have a ratio of 1:4 between filled and empty entries. This is particularly wasteful in view of the large amount of memory space that needs to be allocated for each key.

Moreover, multiple hashing methods ire decidedly non-deterministic, because we cannot know how many different hash functions will be needed in order to distinguish between keys. As a result, it may be possible, or even likely, to find a given entry in only one memory access operation, but in many cases, finding an entry can require several memory accesses. The variance in the number of required memory access operations corresponds to a variance in search time. This variance is particularly undesirable in various networking applications, including the transfer of voice data or video data in information packets via a digital channel.

By sharp contrast, search routines according to the present invention are characterized by low variance in the number of memory access operations. Perhaps more importantly, search routines according to the present invention have a significantly more efficient usage of memory space relative to multiple hashing routines of the prior art, while maintaining high hit ratios. The principles and operation of the search method and system according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawing. The invention is capable of other embodiments or of being practiced or carried out in various ways. Also, it is to be understood that the phraseology and terminology employed herein is for the purpose of description and should not be regarded as limiting.

Figure 3:
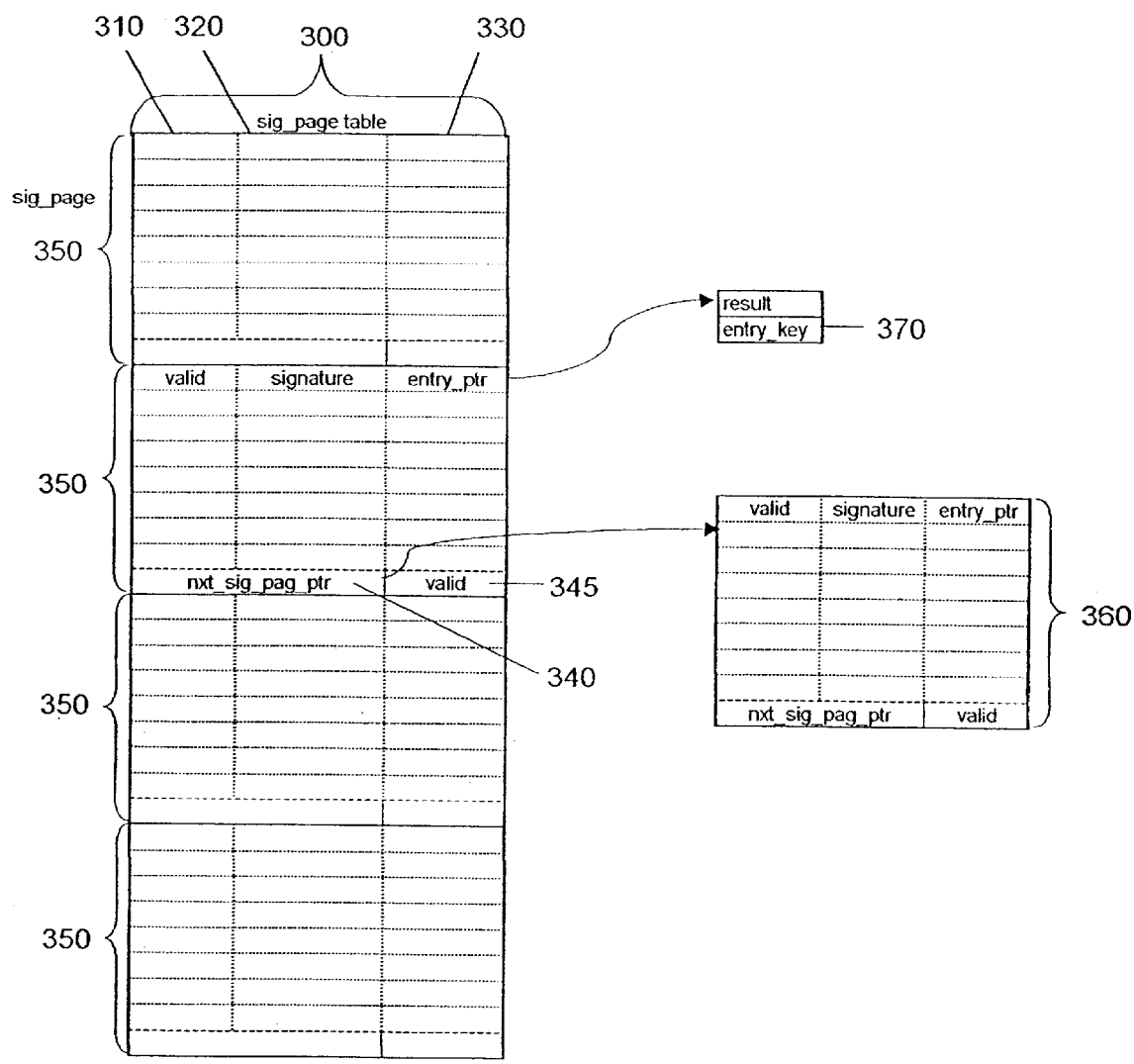
FIG. 3 depicts a series of intermediate lookup tables for use in a search sequence according to the present invention.
Figure 4:
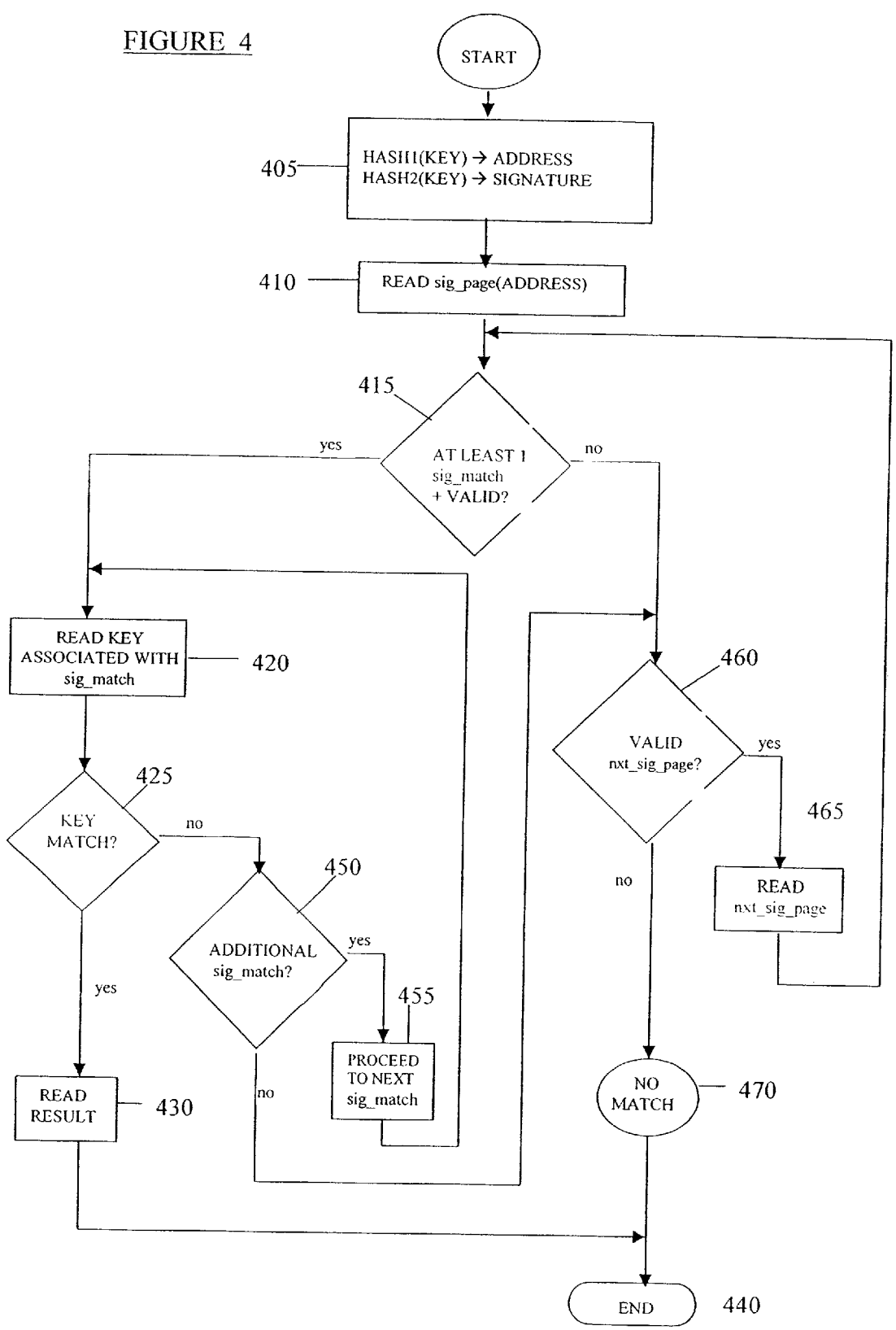
FIG. 4 shows a general flow chart of a table searching operation according to the present invention.

Referring now to FIG. 3 and FIG. 4, FIG. 3 depicts a series of intermediate lookup tables for use in a search sequence according to the present invention. FIG. 4 shows a general flow chart of a table searching operation according to the present invention, wherein the search sequence utilizes intermediate lookup tables like those provided in FIG. 3.

The main intermediate table, provided in FIG. 3, is called sig_page table 300. The three columns in the sig_page table 300 consist of a "valid" column 310, a signature column 320, and an entry pointer ("entry_ptr") column 330. The sig_page table 300 consists of many three-column blocks, called signature pages ("sig_page") 350. In FIG. 3, by way of example, each signature page 350 has 9 rows: 8 rows for the valid, signature, and entry pointer attributes, and a ninth row containing two attributes, a next signature page pointer ("nxt_sig_pag_ptr") 340, and a valid attribute 345 associated with the next signature page pointer 340.

In a similar fashion to conventional hashing routines, the address (row number) or location of each signature page 350 is the result of a hash function on the search key. We will call this hash function "HASH1". Unlike conventional hashing routines, however, the signature table (intermediate table) does not contain the actual search key. Instead, the signature table contains a "signature" and a pointer ("entry_ptr") associated with the signature in the same row. The pointer points to the actual location 370 of the key. The signature, located in the signature column 320, is the result of a second hash function, "HASH2", on the key. Thus, each key is hashed twice: HASH1 determines the location of the signature page, and HASH2 provides a signature to differentiate between HASH1 collisions, i.e., two or more keys that are translated by HASH1 into the same location or signature page 350. When a HASH1 collision occurs, the colliding element is not sent to a succeeding table as in multiple hashing routines. Instead, the colliding key is entered as a signature in the same signature page 350 corresponding to the HASH1 result, but in a different row within the signature page 350. As mentioned above, each signature page 350 in FIG. 3 (by way of example) has 8 rows for the valid, signature, and entry pointer attributes. The number of rows per signature page 350 is chosen such that in the overwhelming majority of cases, the signature page 350 can contain all HASH1 collisions.

In the unlikely event that the signature page 350 fills up, the last row of the signature page contains a next signature page pointer 340 that points to the location of the next signature page 360 and a valid attribute 345 that indicates the need (valid=1) to search the next signature page 360.

Referring now to the flow diagram provided in FIG. 4, the table searching operation according to the present invention begins in step 405 with the translation of the search key into an address by hash function HASH1(key) and into a signature by hash function HASH2(key). In step 410, the routine reads the signature page ("sig_page") corresponding to the address obtained using the first hash function.

In step 415, the signature of the search key is compared with the signature(s) in the above-mentioned signature page. If there is at least one match between the signature(s) in the signature page and the signature of the search key (there being at least one valid signature in the signature page), the routine continues to step 420, where the key associated with the first matching signature is read. The key location is indicated by the pointer of the first matching signature. If the key in the entry matches the search key (step 425), the result is read (step 430) and the search is brought to a successful end 440.

If, however, the key in the entry does not match the search key (step 425), the routine proceeds to step 450 and searches for an additional signature match in the signature page. If an additional match is found, the routine is directed (step 455) to loop back and read the key associated with the "new" matching signature, and the routine continues as described above. In the event that no additional signature match is found in step 450, the search routine then proceeds to step 460, where the last row of the signature page is examined to determine whether there is a valid next signature page ("nxt_sig_page"). The search routine also proceeds to step 460 in the event that no valid signature match was found in step 415, described above. In either case, if a valid next signature page is found at step 460, the next signature page is read in step 465 and the routine loops back to step 415, where the routine determines whether there is a match between the signature of the search key and any signatures appearing in the (new) signature page.

If no valid next signature page is found at step 460, then the routine concludes that there is no match (step 470), and the search ends (step 440) unsuccessfully.

As used herein in the specification and in the claims section that follows, the term "signature page overflow" refers to at least one next signature page.

It must be emphasized that the incidence of collision in the second hashing, according to the present invention, is extremely low. This is also true of any subsequent hashings, if they are necessary. In conventional multiple hashing routines, collision rates of about 20% are typical in each stage, even using efficient hash functions. The high incidence of collision stems from the difficulty in obtaining a unique hash function result (table address) for each key, given an extremely large number of keys (see Example 1 below, wherein 51,200 keys are rehashed in the second table). Moreover, there is no internal ordering of the keys using the information provided by the first hash function.

In the present invention, however, the first hash function result is used to determine the page ("signature page") of the key.

As mentioned above, when a HASH1 collision occurs in a search routine of the present invention, the colliding key is not sent to a succeeding table as in multiple hashing routines. Rather, the colliding key is entered (as a signature) in the same signature page (the location of which corresponds to the HASH1 result), but in a different row of the signature page. Each signature page has multiple rows for the signature attribute. Thus, the (signature) keys are ordered in a structure based on the result of the first hash function. Consequently, the second hash function does not have to distinguish between the entire field of collisions from the first hash function. Because of the internal ordering based on the result of the first hash function, the second hash function merely has to distinguish between a small number keys that were indistinguishable using the first hash function.

This fundamental difference has numerous ramifications on the structure of the search algorithm and on the optimal allocation of memory space. In conventional hashing routines, collisions are highly undesirable, to the extent that complicated hash functions requiring sparsely-populated tables are used. Typically, such tables have a ratio of 1:4 between filled and empty entries, which yields a fill percentage (100*ratio of filled entries to total entries) of only 20%.

By sharp contrast, because the second hash function in the present invention must distinguish between a very small number of colliding key signatures, the first hash function can be more simple than in conventional hashing routines, and more importantly, the number of addresses (each address corresponding to a unique signature page) is typically only about 25% of the number of keys, corresponding to a fill percentage of 70–90% and above.

From the above description, it is obvious to one well-versed in the art that the search routine according to the present invention has several important features and advantages relative to methods of the prior art. The search routines according to the present invention have significantly improved the average search time and/or the required memory allocation relative to conventional multiple hashing techniques (see Example 2 below). In addition, these search routines provide a very high probability of funding an entry in exactly two memory access operations. This provides deterministic performance (very low variance) for systems that utilize hash searching methods.

Figure 5:
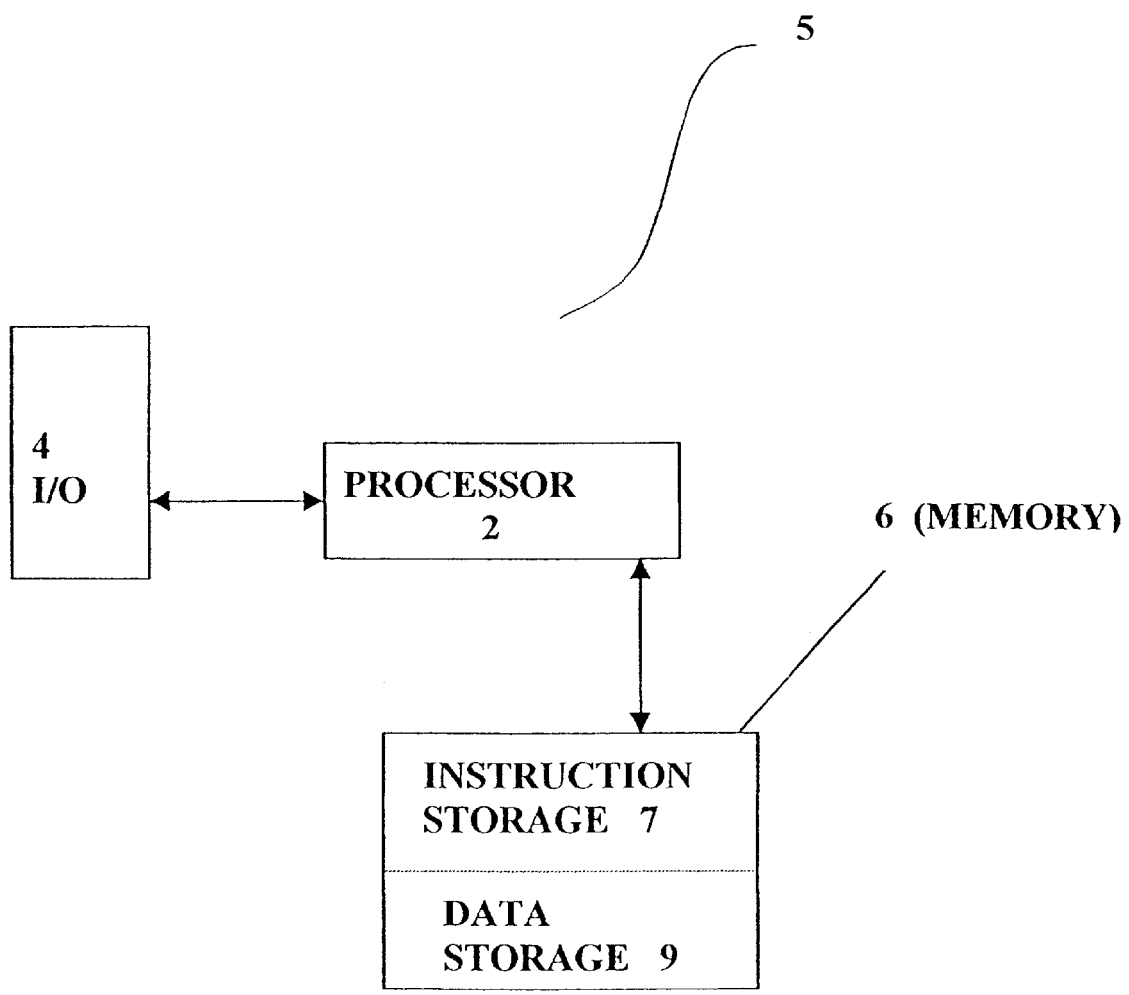
FIG. 5 is a block diagram illustrating a typical router and the subsystems thereof, in accordance with the present invention.

FIG. 5 is a block diagram of a system 5 according to the present invention. System 5 includes a processor 2, a memory 6, and an I/O block 4. Memory 6 includes an instruction storage area 7 and a data storage area 9. This general system architecture allows the processor 2 to perform the search algorithm by the method according to the present invention.

Figure 6:
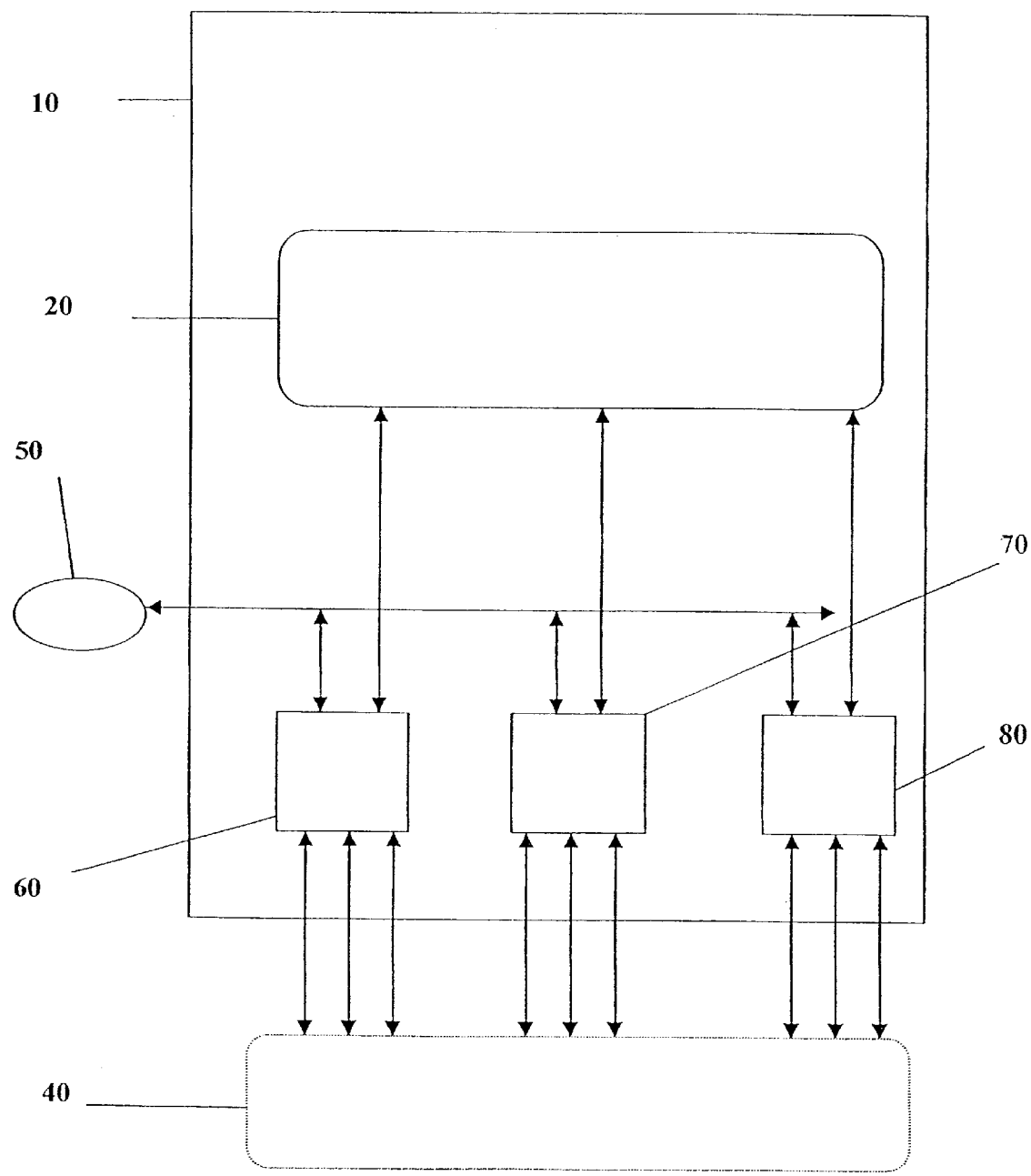
FIG. 6 is a block diagram illustrating a typical architecture of one of the subsystems of FIG. 5, in accordance with the present invention.

Referring now to FIG. 6, there is shown a block diagram illustrating a typical router 10 and the subsystems (and auxiliary systems) thereof, in accordance with the present invention. Within the router 10 are situated a switching fabric 20 and at least one device 60,70,80 interacting with at least one host 50 (situated outside the router 10), the switching fabric 20, and links to a communication medium 40 outside of the router 10. Information frames (units) are transferred between an individual device (e.g., 60) and the switching fabric, which in turn transfers the frame to the appropriate device (e.g., 70). The host 50 manages and controls the various operations.

Each of devices 60,70,80 is usually a single integrated circuit or a group of integrated circuits on one or more hardware boards. The links with which the devices 60,70,80 interact belong to a communication medium 40 such as ETHERNET, TOKEN-RING, SONET, or the like. The number of ports connecting each device (e.g., 60) to the communication medium 40 is 8, 16, or 24 in most conventional devices.

It must be emphasized that the above-described configuration is presented by way of example in a non-limiting fashion. For example, the at least one host 50 is often situated inside the router 10.

Figure 7:
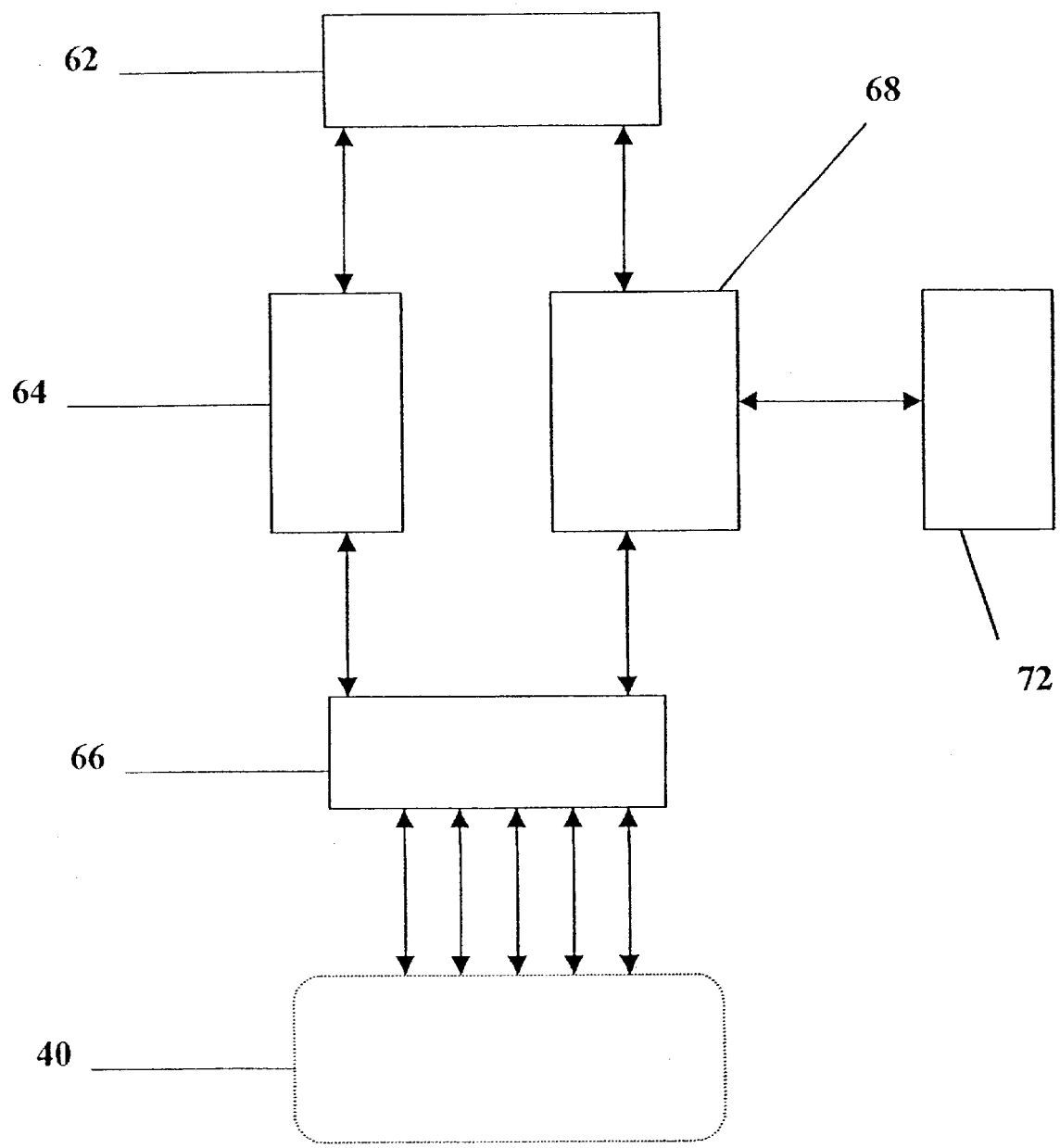
FIG. 7 is a block diagram illustrating a typical architecture of one device of FIG. 6, in accordance with the present invention.

FIG. 7 is a block diagram illustrating a typical architecture of one device (e.g., device 60) of FIG. 6, in accordance with the present invention. The interface between the switching fabric (of FIG. 6) and the device is the switching fabric controller 62. The interface between the link (of FIG. 6) and the device is the link controller 66. Frames are transferred between the link controller 66 and the data memory 64, and between the data memory and the switching fabric controller 62. An Address and Policy Resolution Logic (APRL) unit 68 transfers information to and from the link controller 66 and to and from the switching fabric controller 62.

In a typical operation, the link controller 66 receives a search key from the communication medium 40 via a link, and inputs the search key to the APRL 68. The APRL 68 accesses the search memory 72, wherein the information tables of the present invention are stored. The table searching operation begins with the translation of the search key (e.g., MAC address, IP address, TCP/IP session) into a (table) address by hash function HASH1(key) and into a signature by hash function HASH2(key), as described above and as illustrated in FIG. 4. The search results, e.g., frame destination(s), filtering (frame forwarding or dropping), and associated actions to the frame (e.g., modifying the fields of a particular frame), Qos (Quality of service to the frame), and the key itself, are transferred to the switching fabric (not shown) via the switching fabric controller 62. In some cases the search results include session identifiers. The switching fabric then routes the information to the link via the appropriate device, as shown in FIG. 6.

EXAMPLES

Reference is now made to the following examples, which together with the above descriptions, illustrate the invention in a non limiting fashion.

EXAMPLE 1 (PRIOR ART)

Consider a system with 256,000 MAC (Media Access Control) address entries, with each MAC address filling 48 bits (6 bytes). Associated with each MAC address is a "result" containing priorities, routing directions, etc. The memory allocation for each result depends on the particular application, but typically each result fills 96 bits, such that the total allocation for MAC address with result is 144 bits. Using an efficient, prior art multiple hashing routine, as described above, memory space is allocated such that the first hash table has roughly four empty entries per filled entry.

Under the above fill conditions, a good hash function typically has a hit ratio of 70–80%, i.e., a 70–80% probability of funding the searched entry. Assuming an 80% hit rate, 204,800 keys are successfully entered in the first hash table. Accordingly, 1,024,000 entries (each entry consisting of 144 bits) need to be allocated for the first hash table.

The remaining 20% (51,200) of the keys are rehashed using a second hash function. Assuming an 80% hit rate using the second hash function, 40,960 keys are successfully entered in the second hash table. The memory allocation for the second hash table is about 5 times 40,960, or 204,800 entries, each entry consisting of 144 bits.

About 10,240 (20%) of the keys require rehashing using a third hash function. The memory allocation for the third hash table, calculated according to the method used above, is about 40,960 entries.

Additional hash functions are used in order to resolve the remaining collisions. Typically, as many as 10 hashings are needed to resolve all collisions in a multiple hashing routine. These additional memory accesses appreciably increase the variance of the response (search time). The total amount of memory space allocated exceeds 1,250,000 entries of 144 bits.

EXAMPLE 2

Consider the system of Example 1 having 256,000 MAC address entries, with each MAC address (48 bit) and associated result (96 bit) filling a total of 144 bits.

According to the present invention, and as described in more detail above, the MAC address and corresponding result are not entered into the hash tables. Each key is automatically hashed twice to determine the location of the signature page (HASH1) and a signature (HASH2) designed to differentiate between any HASH1 collisions. Each signature page, by way of example, has 8 rows for accommodating different signature corresponding to the same signature page. Each signature requires only 6 bits and 18 bits for the pointer, as opposed to 144 bits for the full MAC address and associated result described in Example 1.

The number of addresses or signature pages in the first table is 64,000, i.e., ¼ of the number of keys. This compares very favorably with the 1,024,000 entries (each entry consisting of 144 bits) allocated for the first hash table in the prior-art routine provided in Example 1. If we assume that every address has been filled, there will be an average of 4 keys for each address (as opposed to only about 0.2 keys per address in the conventional routine of Example 1).

In the present invention, the second hash function easily distinguishes between colliding keys. Consequently, the hit rate is about 98% using the second hash function. Thus, after two memory accesses, in the routine according to the present invention, only about 2% of the keys require additional memory access, as opposed to 4% in the conventional routine of Example 1.

The differences in memory allocation between the above-described configuration of the present invention and the memory allocation in the multiple hashing scheme of Example 1 are provided below. Because the requisite additional memory allocation after 2 memory accesses is very small, the basis for comparison, as a simplifying assumption, is 2 memory accesses.

Example 1 (after 2 memory accesses = 96% hit rate)

$$1{,}230{,}000 \times 144 = 1.77 * 10^8 \text{ bits}$$

Present Invention: (2 memory accesses = 96% hit rate)

full MAC address + result: $256{,}000 \times 144 = 0.37 * 10^8$ bits;

signature page table:

$$\frac{64{,}000 \text{ sig. pages} \times 8 \text{ rows} \times (6 \text{ bits} + 18 \text{ bits}) = 0.12 * 10^8 \text{ bits}}{\text{TOTAL, present invention:} \qquad 0.49 * 10^8 \text{ bits}}$$

Thus, for the same hit rate after two memory accesses, the present invention requires only about 27% of the memory space required by the conventional multiple hashing routine ($0.49 * 10^8$ bits/$1.77 * 10^8$ bits).

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A computer implemented method for storing a plurality of keys using a hash table, the method comprising the steps of:
   (a) hashing the keys using a first hash function to produce a plurality of table addresses, wherein each of the keys is associated with a single table address of said table addresses in the hash table;
   (b) hashing the keys using a second hash function, distinct from said first hash function, thereby transforming the keys into key signatures, and
   (c) entering a plurality of said key signatures in a signature page located at a single table address of said table addresses.

2. The method of claim 1, further comprising the step of:
   (d) entering a plurality of pointers in said signature page, each of said pointers corresponding to one of said key signatures and pointing to a particular one of the keys.

3. The method of claim 1, wherein steps (a) and (b) are performed prior to step (c).

4. A computer implemented method for retrieving a tabulated key using a search key, comprising the steps of:
   (a) providing a plurality of signature pages, each of said signature pages having a single table address and space for a plurality of key signatures, each key signature of said key signatures including:
      (i) a corresponding tabulated key;
   (b) hashing the search key using a first hash function, thereby transforming the search key into a table address;
   (c) hashing the search key using a second hash function, distinct from said first hash function, thereby transforming the search key into a search key signature, and
   (d) searching said plurality of signature pages for a signature page having said table address of step (b) for at least one match between said search key signature and at least one of said key signatures.

5. The method of claim 4, further comprising the step of:
   (e) if said search for said at least one match yields at least one matching key signature from said key signatures: searching for a match between said search key and said tabulated key corresponding to said at least one matching key signature.

6. The method of claim 4, wherein each said key signature further includes:
   (ii) an associated key pointer pointing to said corresponding tabulated key.

7. A system for storing and retrieving data using a search key, the system comprising:
   (a) a data storage module having a plurality of signature pages, each of said signature pages having a single table address and space for a plurality of key signatures, each of said key signatures having a corresponding key, and
   (b) a processor that is operative to perform operations including:
      (i) hashing the search key using a first hash function, thereby transforming the search key into a search key table address;
      (ii) hashing the search key using a second hash function, distinct from said first hash function, thereby transforming the search key into a search key signature;
      (iii) searching said signature page at said search key table address for at least one matching key signature to said search key signature.

8. The system of claim 7, wherein said processor is further operative for:
   (iv) if said searching yields at least one matching key signature from said key signatures: searching for a match between said search key and said corresponding key, said corresponding key corresponding to said matching key signature.

9. The system of claim 7, further comprising:
   (c) an input/output unit for transferring, to and from said processor, information selected from the group consisting of said corresponding key, said search key, and instructions.

10. A computer implemented method for storing a plurality of keys using a hash table, the method comprising the steps of:
    (a) hashing the keys using a first hash function to produce a plurality of table addresses, wherein each of the keys is associated with a table address of said table addresses in the hash table;
    (b) hashing the keys using a second hash function, distinct from said first hash function, thereby transforming the keys into key signatures, and
    (c) following steps (a) and (b), entering a plurality of said key signatures in a signature page located at a table address of said table addresses.

11. The system of claim 10, wherein, at least two of the keys are hashed in step (a) using said first hash function to obtain an identical table address among said table addresses, and wherein, in step (c), key signatures of said at least two of the keys, produced in step (b), are entered in said signature page located at said table address.

* * * * *